INVENTORS
Kenneth D. Swander, Jr.
Charles G. Wearden
BY
ATTORNEYS

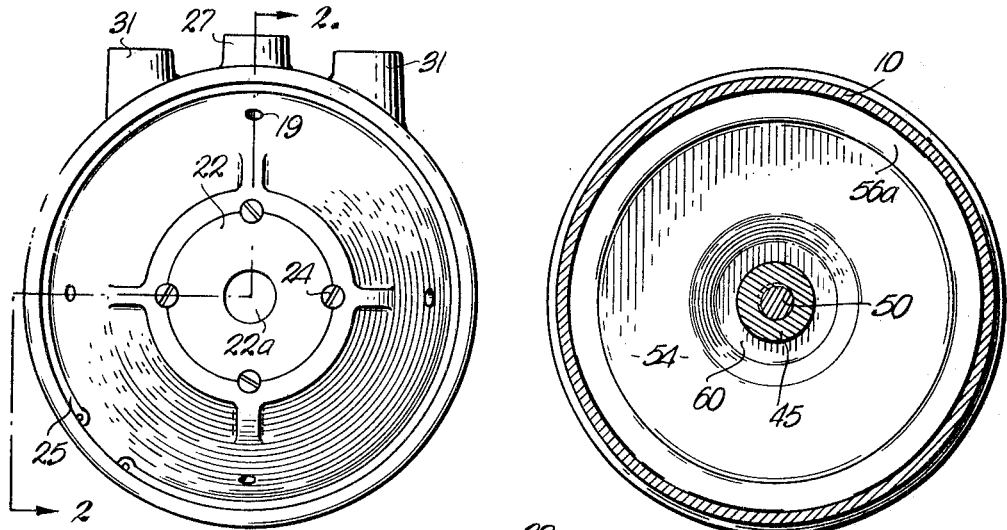
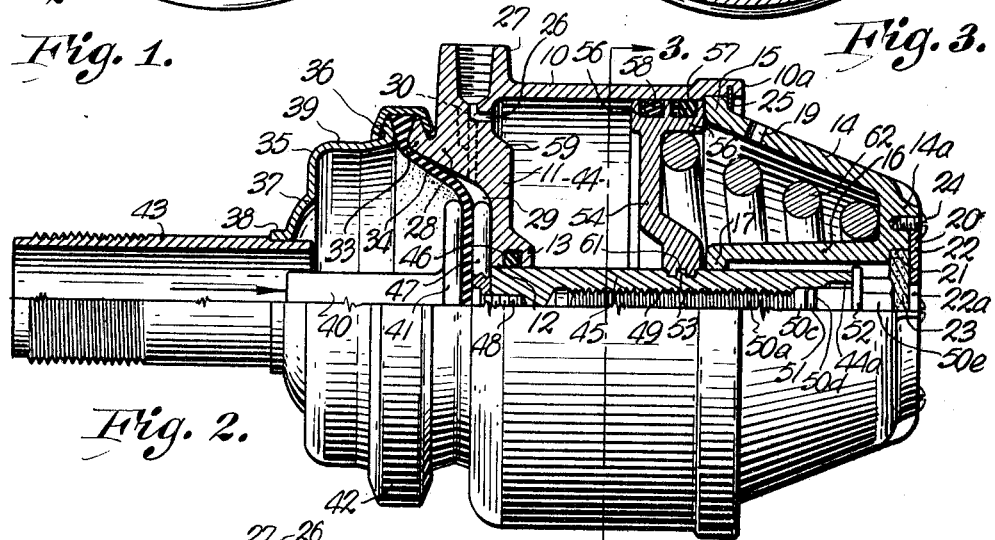
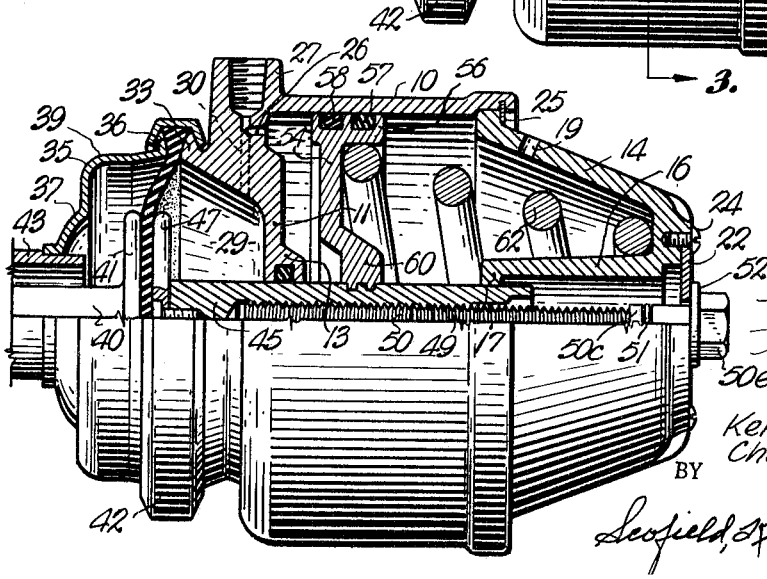

INVENTOR
Kenneth D. Swander
Charles G. Wearden
BY
Scofield, Kokjer, Scofield & Lowe
ATTORNEYS INVENTOR
Kenneth D. Swander
Charles G. Wearden April 28, 1970    K. D. SWANDER, JR., ET AL    3,508,470

BRAKE ACTUATOR

Filed March 10, 1969    5 Sheets-Sheet 5

INVENTOR
Kenneth D. Swander
Charles G. Wearden

BY
ATTORNEYS

United States Patent Office 3,508,470
Patented Apr. 28, 1970

3,508,470
BRAKE ACTUATOR
Kenneth D. Swander, Jr., and Charles G. Wearden, Prairie Village, Kans., assignors to Certain-Teed Products Corporation, Ardmore, Pa., a corporation of Maryland
Continuation-in-part of application Ser. No. 520,693, Jan. 14, 1966. This application Mar. 10, 1969, Ser. No. 812,538
Int. Cl. F01b 7/00, 29/00, 31/00
U.S. Cl. 92—63           12 Claims

ABSTRACT OF THE DISCLOSURE

A vehicle spring emergency and parking brake of the "add-on" or "piggy back" type with the spring chamber outboard (with respect to the wheel, axle or brake, per se) of the service (diaphragm) chamber, said add-on brake having a mechanical release (manual spring back-off) utilizing a bolt stored within the spring chamber itself, one modification having means preventing or warning of attempts to recompress the emergency spring before the bolt is restored to its storage position within the spring chamber, one modification having an anti-explosion device coupled with the storage of the bolt within the spring chamber, and one modification having a portion of the spring chamber retractable within the spring chamber housing itself when the emergency of power spring has been expanded.

---

This application is a continuation-in-part of our application Ser. No. 520,693, filed Jan. 14, 1966 for "Brake Actuator," and now abandoned.

The general intent of all spring brake actuators is to provide a means of applying the foundation service brakes on one or more axles of a vehicle when same has lost its normal air pressure required to operate the service brake chamber. Under these conditions, it is considered operating as an emergency brake. When the air pressure that is introduced to the spring mechanism air chamber is controlled by the driver and only exhausted after a vehicle is brought to a stop with its service brakes, then it is considered a parking brake.

"Add-On" units are basically spring brake chambers that are attached to a portion of the existing service brake chamber that is already mounted on the vehicle. The "Add-On" type transfers the spring force through a sealed common inner wall, thence to the pressure side of the normal service brake diaphragm, then through the brake application rod and mechanism to the brake shoes, whether it is a cam or a wedge brake mechanism. Many previously designed "Add-On" actuators have had some type of threaded mechanism to permit either the compressing or the relaxing of the power spring for either installing convenience or releasing the spring force that would be applying the brakes and preventing the vehicle from being moved.

The invention basically comprises a device which will apply brakes by spring force when the air pressure in the system drops below a predetermined value. It also will allow this spring force to be released by jack screw action while the air pressure is low. Furthermore, it is so arranged that it will be readily apparent to visual inspection that this spring force has been mechanically released.

An object of the instant invention is to provide an improved "Add-On" emergency and parking brake system particularly incorporating an improved mechanical release for the spring brake.

Another object of the invention is to provide an improved "Add-On" type of emergency and parking brake actuating mechanism which can be economically manufactured, is sturdy in construction, easy to assemble and install and has new and improved features of construction, arrangement and operation.

Another object of the invention is to provide an improved mechanical release construction for a spring emergency brake of the "Add-On" type which is so constructed and arranged as to eliminate the objections and failure hazards heretofore present in similar units.

Another object of the invention is to provide a mechanical release device for an "Add-On" type emergency and parking brake for vehicles wherein the spring emergency brake may be released to a greater or lesser extent as desired by the operator.

Another object of the invention is to provide a mechanical release device for an "Add-On" type spring emergency brake for vehicles wherein, to release the emergency or parking spring, the operator must remove a shield plate from the brake housing, remove a threaded bolt from within the housing, replace the shield plate, put the bolt through the plate and thread into the piston and recompress the spring. Furthermore, to return the brake to regular operation, the above described steps must be fully performed in reverse order.

An object of the invention is to provide an "Add-On" type spring emergency and parking brake wherein, to effect the mechanical release function, certain required operations are required to take place in a certain sequence before the mechanical release function can be exercised, a certain effect takes place while the mechanical release function is in effect, and, then, a certain required sequence is necessary to be gone through when the mechanical release feature is to be put into abeyance.

Another object of the invention is to require a mechanical release device associated with an "Add-On" type spring emergency and parking brake wherein the bolt used with the mechanical release is stored within the "Add-On" unit and correct internal storage or replacement of the plate utilized on the outside of the brake unit and full threading of the bolt into the internal brake structure is required.

An object of the instant invention is to provide a mechanical release device, structure and function wherein there is an external plate required to be removed which has a perforation therein, wherein there is engagement of the bolt through the plate into an internally threaded member to effect the mechanical release, wherein there is a sizing of the member in which the bolt is internally stored with respect to stopping of the piston by the housing whereby the bolt must be fully stored before the plate can be rescrewed into the outer housing, wherein an anti-explosion feature is provided certain modifications of the device and wherein the spring chamber is sealed to air and external contamination when the bolt has been stored within the spring housing for normal use of the brake.

Another object of the invention is to provide a mechanical release device which is used in association with an "Add-On" type spring emergency and parking brake actuator, wherein where it is desired that the user have the option of mechanically releasing the brake by means which are available and attached to the brake, the bolt and plate which are required to effect the mechanical release are furnished with the unit with the power spring in released position, whereby the dealer may disengage the mechanical release, permitting the power spring to go forward and then throw the bolt and plate away. The opening in the housing may then be sealed with a simple insert. Thereafter, for maintenance, a bolt may be inserted through a slit in the seal or a new plate and bolt furnished.

In the drawings, which form a part of the instant specification and are to be read in conjunction therewith, embodiments of the instant invention are shown and, in the various views, like numerals are employed to indicate like parts.

FIG. 1 is a plan view of the outer end of the spring brake comprising the instant invention.

FIG. 2 is a view taken along the line 2—2 of FIG. 1 in the direction of the arrows.

FIG. 3 is a view taken along the line 3—3 of FIG. 2 in the direction of the arrows.

FIG. 4 is a view like that of FIG. 2, but with the emergency spring in expanded position and the mechanical back-off or release means in operating position.

Figure 5:
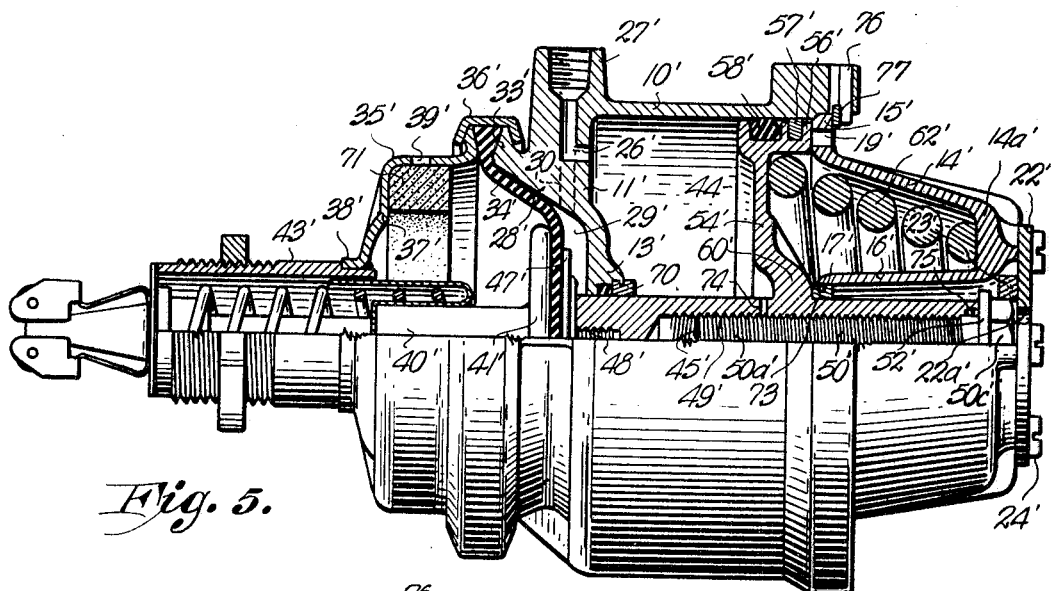
FIG. 5 is a view like that of FIG. 2, but showing a modified from of spring brake.

Referring to the drawings, at 10 in FIGS. 1–4, inclusive, is seen the cylindrical side wall of a spring brake cylinder. The inward (toward the vehicle brake assembly) end of wall 10 comprises interwall 11 having central opening 12 therethrough in a slightly outwardly formed portion 13 thereof. At 14 is seen the outwardly extending wall portion of a removable cylinder head and spring support, same having peripheral outwardly extending flange 15 and a central inwardly extending recess formed by wall portion 16. Wall 16 has central flange 17 at the inward end thereof with an opening therethrough. Breather or vent opening 19 is formed through a peripheral portion of wall 14. A pair of indents 20 and 21 are formed in the outermost wall portion 14a of the cylinder head and spring support to receive cap plate 22 and dust 23 and water filter and seal 23 therein, respectively. Suitable openings are provided for cap screws 24, the latter retaining cap plate 22 in cylinder head portion 14a. An opening 22a is formed centrally of plate 22.

Outwardly displaced outer end portion 10a of cylinder side wall 10 receives flange 15 on the inner portion thereof and has a groove circumferentially formed to receive lock ring 25 therein, or other suitable retaining means, to hold removable cylinder head and spring support 14 with respect to cylinder side wall 10. Air pressure opening 26 is provided adjacent inward end of wall 10, to which opening is connected fitting 27.

Integrally formed with interwall 11 or welded or otherwise securely attached thereto is the side wall 28 of the pressure passages or opening 30 communicating therewith with pressure input fitting (FIG. 1) 31 connected thereto. The inward flange 33 of wall 28 receives conventional flexible diaphragm 34 in engagement thereagainst. The other half of the service chamber side wall is designated 35 and has diaphragm abutting flange 36, inwardly extending inner wall portion 37 with terminal flange 38 thereon and breather hole 39 therethrough.

Piston rod 40 has pad 41 connected to the outer end thereof, the latter abutting in conventional manner against the inward side of diaphragm 34. A diaphragm return spring (not shown) may or may not be used in conventional manner, typically acts between 37 and pad 41. Ring 42 engages flanges 33 and 36 of service chamber wall portions 28 and 35 and the periphery of diaphragm 34 therebetween. Hollow cylinder 43 encircles piston rod 40. The view shows one of the means of connecting to the vehicle wedge brake mechanism, other means required for cam brakes, not shown.

Returning to the emergency or safety brake chamber generally designated 44 and defined within walls 10 and 11 and inward of the piston to be described, elongate piston or push rod 45 is having sealing means 46 therein. Plate or disc 47 is connected to the inward end of push rod 45 by screw 48 or other suitable means and abuts the side of diaphragm 34 opposite that of pad 41 on piston rod 40. The center of piston rod 45 is hollow for part of its length and internally threaded as at 49 whereby to receive the externally threaded elongate shaft portion 50a of an elongate bolt having outer nonthreaded portion 50c, the latter having seal groove 50d containing seal means 51. Enlarged head or washer head 52 on bolt 50 is of greater outer diameter than the larger inner diameter outer portion 49a of the hollow center of push or piston rod 45. Greater outer diameter washer 52 seats itself, in the assembly of FIG. 2, on the outer limit of push or piston rod 45 and is also of greater outer diameter than opening 22a in cap plate 22. Head or washer on bolt 50 is also of greater outer diameter than opening 49a, but bolt portion 50c is not. In its length, the push rod or piston rod 45 is doubly grooved to provide engaging flange 53 which locks push rod 45 to piston 54. The opening through the center of flange 17 has a sliding friction fit on the outer surface of push or piston rod 45 and there may be sealing means provided in same as will be described with respect to FIG. 5.

Piston 54 has outwardly extending circumferential wall portion 56 having circumferential slots or grooves formed therein to receive oil wiping ring 57 and seal means 58 whereby to pressure seal against the inside surface of wall 10. The peripheral inward portion piston 54 may be inwardly extended as to 56a to engage circumferential recess or indented portion 59 in interwall 11. Piston central portion 60 is indented outwardly whereby to overlie bearing or fitting 13, as best seen in FIG. 4, and has opening 61 centrally therethrough to receive in connected or fixed fashion piston or push rod 45. Piston rod 45, as noted, moves at all time in concert with piston 54.

Any suitable power spring 62 abutting between wall portion 14a and the outer surface of piston 54 is employed in the usual manner of a spring safety brake.

Compressed air to the service chamber 29 can enter and exhaust through either tapped hole 31. The two holes 31 are provided for ease of connection. If air is brought in through one port, the other port may be connected to another actuator or another wheel. If this is not done, the other hole may be closed with a plug. Compressed air to the spring compressing chamber 44 enters through tapped hole 27 and air passage 26. When a sufficient pressure of air is present in chamber 44, the piston 54 is forced to the right as shown in FIG. 2. This compresses spring 62 and also brings disc or pressure plate 47 to the right in the view, close to the cylinder casting at 11 or 13.

When the spring is compressed, the service brake works in the normal manner, that is, under the influence of air pressure in the service chamber 29 acting on the flexible diaphragm 34. When pressure is increased, diaphragm 34 is forced to the left in the view of FIG. 4, moving push rod 40 and pad 41 applying the brake. Under these conditions, piston 54 and piston rod 45 remain as shown in FIG. 2. When pressure is reduced, the diaphragm 34 moves to the right to the position shown in the drawing. Push rod 40 moves to the right along with it, forced by a return spring which is not shown. This releases the brake.

When air is released from chamber 44, the spring 62 forces piston 54 and pressure plate 47 to the left in the view of FIG. 2, thereby applying the brakes. The brakes can be released only by reinstating the air pressure in chamber 44 or by using the release bolt as described below.

To use the release bolt 50, the cover or cap washer or plate 22 with filter 23 is removed by taking out the (generally four) screws 24. This filter is typically a porous material which serves to exclude water and dirt. Release bolt 50 is then unscrewed from threaded portion 49 of piston rod 45, using a suitable wrench on its head 50e. The bolt is completely removed from the actuator.

Cover washer or plate 22 is then replaced, together with screws 24 and the release bolt 50 inserted through the opening 22a in plate 22. Bolt 50 is rethreaded into tapped hole 49. As previously mentioned, hole 22a in plate 22 is large enough for the bolt to pass through, but not large enough for enlarged head 52 to pass through. The bolt is then tightened. It acts like a jack screw, pulling piston rod 45 and piston 54 to the right toward plate 22. This compresses spring 62 and releases the brake to the extent the operator threads bolt 50 into piston rod 45.

When the operator wishes to restore normal brake operation, the procedure is reversed. The operator unthreads bolt 50 from push rod or piston rod 45, thereby permitting spring 62 to fully return piston 45 to the left hand position of the drawings or the brake applied condition. Release bolt 50 is then removed from outside plate 22, plate 22 removed from end wall 14a and, thereafter, bolt 50 rethreaded into the hollow center of push rod or piston rod 45. Filter 23 is replaced and cover washer or plate 22 reinstalled and held in place by the four screws 24.

It is dangerous to operate a vehicle with the spring brake mechanically released because there is no emergency brake operation available. With the instant actuator, it is easy to see that the spring brake has been mechanically released because the bolt head 50e will project beyond the cover washer or plate 22.

Figure 6:
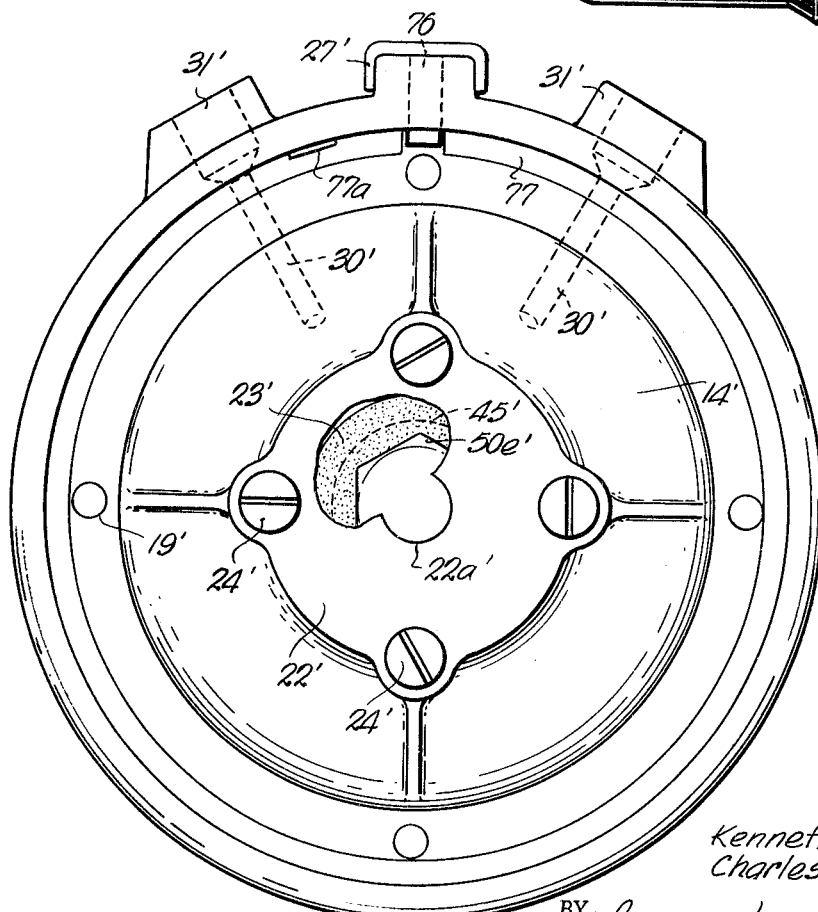
FIG. 6 is a view like that of FIG. 1, but of the device of FIG. 5.

Referring to FIGS. 5 and 6, therein is shown a slightly modified form of the safety brake construction of FIGS. 1–4, inclusive. Since there are many identical or substantially identical parts in the various views, such identical or substantially identical parts will be numbered the same in the various views, but primed in FIGS. 5 and 6. The additions and changes between the two figures will now be individually described.

First, piston rod or push rod 45' is cast formed integral with piston 54' instead of fixed centrally thereof. Secondly, a bushing may be employed at 70, immediately above sealing means 46' in interwall center boss 13'. Thirdly, a filter of porous resilient material, as at 71, may be employed with respect to vent opening 39', allowing air to move in and out of chamber 72 as the diaphragm 34' moves back and forth, but excluding dust and other dirt. A bushing may be additionally employed at 73, mounted on flage 17' in the cylinder head whereby piston rod 45' or piston hub extension outwardly of piston 54' may move more freely and with better sealed action inwardly and outwardly thereof.

Turning to more major differences, at 74 in FIG. 5 is shown a vent opening communicating between space 44' and the internally threaded passage 49' of piston rod 45'. This vent allows compressed air to escape from chamber 44' into threaded hole 49'. If the release bolt 50 is not in place in the position seen in FIG. 5 where seal means 75 can make a seal, this air can escape out through opening 22a' in plate 22'. A corresponding seal means is seen at 51 in FIG. 2. If the release bolt 50' is in place, a seal is made by seal means 75, which prevents the escape of air. This will permit the safety brake to be released by the raising of air pressure again in chamber 44'. On the other hand, if bolt 50 has been engaged into push rod or piston rod 45' from a position outside of cap plate 22', such seal is not present and the bleeding of air pressure from chamber 44' prevents the release of the brake or in audible to the extent that it becomes obvious to the operator that the unit is improperly adjusted.

A further difference between the forms of FIGS. 1–4, inclusive, and FIGS. 5 and 6 is seen in the cylinder head engagement construction operative to prevent rotary motion between cylinder 10' and cylinder head 14'. In the modification of FIGS. 1–4, spring support and cylinder 14 is connected to cylinder 10 by snap ring 25. When the release bolt 50 was turned with the wrench to compress or release spring 62, snap ring 25 sometimes was insufficient to prevent the spring support 14 from turning with reference to cylinder 10. However, in the construction of FIG. 5 and 6, pin 76 passes through a hole in the upper wall portion of cylinder 10' and, additionally, enters a notch in spring support and cylinder head 14'. Snap ring 77 is removable by prying with suitable tool utilizing slot 77a seen in FIG. 6.

Other than described above, the operation and structure of the modifications of FIGS. 5 and 6 are identical with the structure in the previous views.

Commercially, an "Add-On" unit may be supplied as a brake actuator either in combination with the service chamber or solely as a spring unit to be added on to a standard service chamber wherein the inner wall of the "Add-On" unit is substituted for the outer wall of the conventional service chamber.

Figure 7:
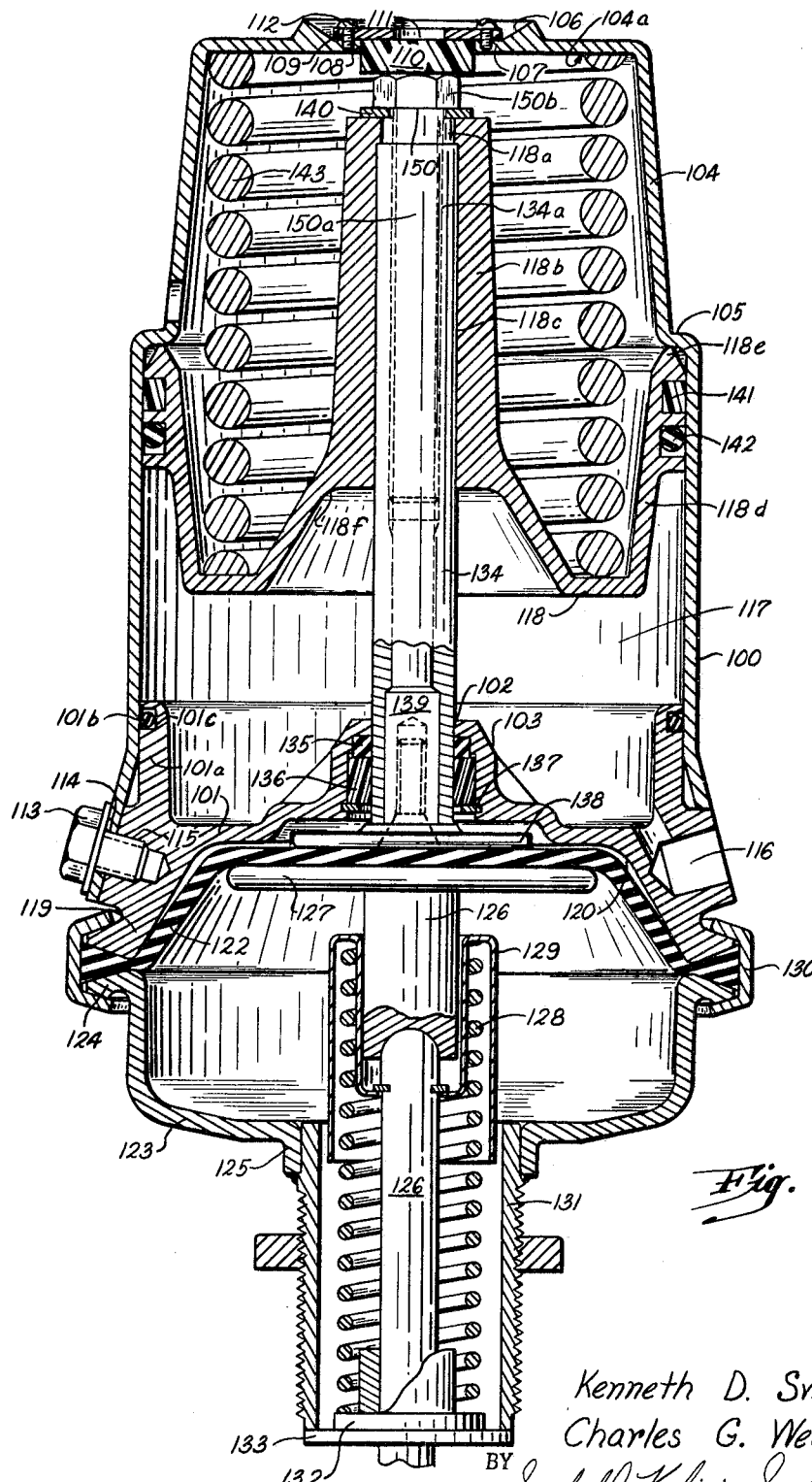
FIG. 7 is a side sectional view of a modification of the add-on spring emergency and parking brake assembly omitting the anti-explosion feature of the modifications of FIG. 1–4, inclusive and FIGS. 5 and 6.

Referring to FIG. 7, at 100 is seen the cylindrical sidewall of a spring brake cylinder. At the inward (toward the vehicle brake assembly) and end of wall 100 is positioned interwall 101 having simple opening 102 therethrough in a slightly outwardly formed portion 103 thereof. At 104 is seen the inwardly indented extension of housing wall 100 which has outwardly peripherally extending flange 105 joining same to wall 100. The outer wall portion 104a has a central, inwardly extending recess 106. Recess 106 has central flange 107 at the inward end thereof with an opening 108 therethrough. Cap plate 109 is received within recess 106 having dust and water filter and seal 110 attached thereto and opening 111 therethrough. Suitable internally threaded openings are provided in flange 107 for cap screws 112, the latter removably retaining cap plate 109 in recess 106.

The lower portion of housing 100 (inward portion) connects to interwall 101 by bolts 113 passing through openings 114 into internally threaded holes 115 in interwall 101. Interwall 101 additionally has outwardly extending flange 101a having seal 101b received in groove 101c. An air passage 116 connects with chamber 117 which is between the interwall 101 and the piston generally designated 118.

The interwall 101 has a circumferential flange portion 119 which extends inward and acts as the outer end wall of the pressure half of a service chamber 120, same having pressure inlet passage or opening 121. Flange 119 receives conventional flexible diaphragm 122 in engagement thereagainst when the service chamber is assembled. The other half of the service chamber wall is designated 123 and has diaphragm abutting flange 124 and inward terminal flange 125 thereon.

Piston rod 126 has pad 127 connected to the outer end thereof, the latter abutting in conventional manner against the inward side of diaphragm 122. A diaphragm return spring 128 abuts outwardly spring retainer 129. Ring 130 engages flanges 119 and 124 of the service chamber wall portion and the periphery of the diaphragm 122 therebetween. Hollow cylinder 131 encircles piston rod 126. The piston rod 126 slidably passes through the inward spring retainer 132 and also through the opening in plug 133.

Returning to the add-on portion of the brake, which constitutes interwall 101 and that portion of the brake outward therefrom, elongate piston rod or push rod 134 is slidably received within opening 102 with seal means 135 and 136 retained thereagainst by retainer 137. Plate or disc 138 is connected to the inner end of push rod 134 by screw 139 and abuts the side of diaphragm 122 opposite that of pad 127. The outward center portion of piston rod 134 is hollow for part of its length and internally threaded as at 134a whereby to receive the externally threaded elongate shaft portion 150a having enlarged head 150b. Head 150b is of greater outer diameter than the relatively greater outer diameter portion 118a of piston 118 outward extension 118b into which piston rod 134 is seized or otherwise fixedly attached in central passage 118c. Washer 140 fits between bolt head 150b and the outer end of piston extension 118a. The outer diameter of bolt head 150b is greater than the size of opening 111 in plate 109, but lesser than the outer diameter of opeing 108 in flange 107 while washer 135 will pass through opening 108, but not opening 111.

Piston 118 has peripheral outward flange 118b whose outward end 118e abuts against flange 105 in its outermost travel with seal means 141, 142 received in grooves therein. A recess 118f is provided in the center underside of piston 188 to overlie extension 103. Power spring 143 abuts against the outward face of piston 118 and the inner face of outer wall 104a.

Compressed air to the service chamber 120 can enter and exhaust through tapped hole 121. Air to the spring compressing chamber 117 enters through opening 116. When a sufficient pressure of air is present in chamber 117, the piston 118 is forced upwardly, as seen in FIG. 7. This compresses spring 143 and also brings disc 138 upwardly in the view close to the interwall 101.

When the spring is compressed, the service brake works in the normal manner, that is, under the influence of air pressure in the service chamber 120 acting on the flexible diaphragm 122. When pressure is increased, diaphragm 122 is forced downwardly in the view of FIG. 7, moving push rod 126 and pad 127 thereby to apply the brake. Under these conditions, with pressure remaining in chamber 117, piston 118 and piston rod 134 remain as shown in FIG. 7. When pressure is reduced in chamber 120, the diaphragm 122 moves upwardly to the view shown in FIG. 7. Push rod 126 moves upwardly along with it, forced by return spring 128. This acts to release the brake.

When air, by whatever reason, is released from chamber 117, the spring 143 forces piston 118 and pressure plate 138 downwardly in the view of FIG. 7, thereby applying the brakes. The brakes can be released only by reinstating the air pressure in chamber 117 or by using the release bolt, as described below.

To use the release bolt 150, plate 109, with filter 110 is removed by taking out the screws 112. The filter is typically a porous material serving to exclude water and dirt. It may be easily detached from the underside of plate 109. Release bolt 150 is then unscrewed from the threaded portion 134a of piston rod 134, using a suitable wrench on its head 150b. The bolt is completely removed from the actuator.

Cover plate 109 is then replaced, together with screws 112 and the release bolt 150 is inserted through the opening 111 and plate 109. Preferably, but not necessarily, washer 140 is replaced between the bolt head 150b and plate 109, penetrated by the shaft of the bolt. Bolt 150 is then rethreaded into the tapped hole 134a. The bolt is then tightened and, acting like a jack screw, pulls piston extension 118b and piston 118 upwardly toward end wall 104a. This compresses spring 143 and releases the brake to the extent the operator threads bolt 150 into the piston extension 118b and piston rod 134.

When the operator wishes to restore normal brake operation, the procedure is reversed. The operator unthreads bolt 150 from piston rod 134, thereby permitting spring 143 to fully return piston 118 to the downward position or the brake applied condition. The release bolt 150 is then completely unthreaded from rod 134 and removed upwardly through plate 109, plate 109 is removed from the end wall recess 106, and, thereafter, bolt 150 is rethreaded into the hollow center of the push rod 134. Filter 109a is replaced and cover plate 109 is reinstalled and held in place by the four screws 112.

It is dangerous to operate a vehicle with the spring brake mechanically released because there is no emergency brake operation available. With the instant actuator, it is easy to see that the spring brake has been mechanically released, because bolt head 150b will project beyond the washer 140 or plate 109.

Figure 8:
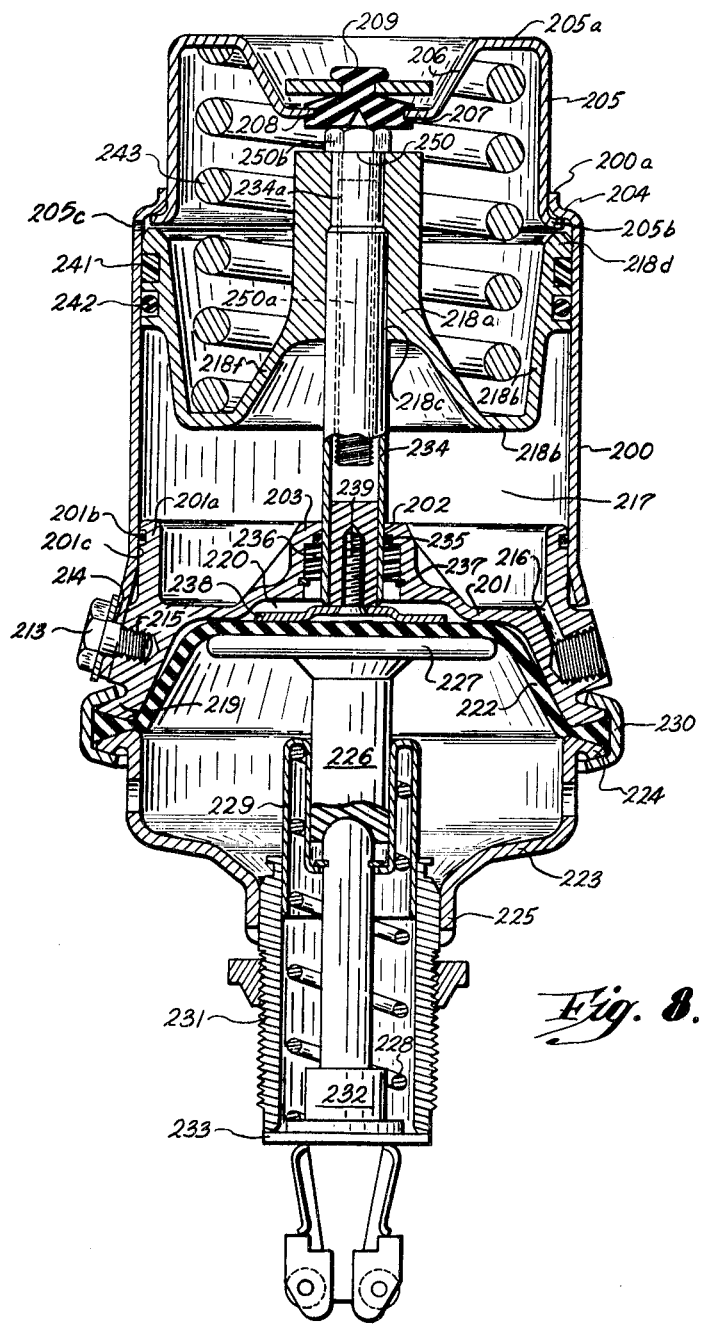
FIG. 8 is a side sectional view of a modification of the instant improvement showing a device analogous to that seen in FIG. 7 but additionally, having the spring chamber divided into two parts whereby the spring emergency unit is "condensable" on itself in a telescoping manner.

Referring to FIG. 8, at 200 is seen the cylindrical side wall of spring brake cylinder. At the inward (toward the vehicle brake assembly) end of wall 200 is positioned inner wall 201 having opening 202 therethrough in a slightly outwardly formed portion 203 thereof. At 204 is seen an inwardly indented peripheral flange 204. The end of side wall 200 is immediately outward of inwardly indented flange 204 at 200a. The outer end of the spring brake cylinder is provided by cylindrical side wall 205, of lesser diameter than side wall 200 whereby to fit within the end 200a thereof. Side wall 205 has outwardly extending peripheral circumferential flange 205b which, when the end of the spring brake cylinder is extended outwardly from the main body of the spring brake cylinder abuts against inwardly extending flange 204 of side wall 200. The outer wall portion 205a of cylinder 205 has a central, inwardly extending recess 206. Recess 206 has central flange 207 at the inward end thereof with an opening 208 therethrough. Cap seal 209 is shown positioned in opening 208, but this may be replaced with a perforated seal plate such as plate 109 and FIG. 7 with an underlying seal equivalent to 109a of FIG. 7.

The lower or inward portion of housing 200 connects to inner wall 201 by bolts 213 passing through openings 214 into internally threaded holes 215 in inner wall 201. Inner wall 201 additionally has outwardly extending flange 201a having seal 201b received in groove 201c. An air passage 216 connects with chamber 217 which is between inner wall 201 and the piston, designated generally 218.

Inner wall 201 has a circumferential flange portion 219 which extends inwardly and acts as the outer end wall of the pressure half of a service chamber 220, same having pressure inlet passage or opening 221. Flange 219 received conventional flexible diaphragm 222 in engagement thereagainst. The other half of the service chamber wall designated 223 and has diaphragm abutting flange 224 and inward terminal flange 225 thereof.

Piston rod 226 has pad 227 connected to the outer end thereof, the later abutting in conventional manner against the inward side of diaphragm 222. A diaphragm return spring 228 abuts outwardly spring retainer 229. Ring 230 engages removably flanges 219 and 224 of the service chamber wall portion and the periphery of the diaphragm 222 therebetween. Hollow cylinder 231 encircles piston rod 226. Piston rod 226 slidably passes through the inward spring retainer 232 and also through the opening in plug 233.

Returning to the add-on portion of the brake, which constitutes inner wall 201 and that portion of the brake outward therefrom, elongate piston or push rod 234 is slidably received within opening 202 with seal means 235 and 236 retained there against by retainer 237. Plate or disc 238 is connected to the inner end of the push rod 234 by screw 239 and abuts the side of diaphragm 222 opposite that abutted by pad 227. The outward center portion of piston rod 234 is hollow for part of its length and internally threaded as at 234a whereby to receive the externally threaded elongate shaft portion 250a of 250 having enlarged head 250b. Head 250B is of lesser outer diameter than that of the relatively greater outer diameter portion 218a of piston 218 into which piston rod 234 is seized or otherwise fixedly attached in central lower passage 218c. The outer diameter of bolt 250, and the head portion 250B thereof is lesser than the internal diameter of opening 208 in cylinder end wall 205a, portion 207, whereby a washer (analogous to 140 and FIG. 7), and an outer plate (analogous to plate 109 and FIG. 7) would necessarily be used for the mechanical release function.

Piston 218 has peripheral outward flange 218b whose outward end 218d abuts against flange 205a in its outermost travel with seal means 242 and 241 received in grooves therein. A recessed 218f is provided in the center underside of piston 218 whereby to overlie extension 203. Power spring 243 abuts against the outward face of piston 218 and the inner face of outer wall 205a.

Compressed air to the service chamber 220 can enter and exhaust through tapped hole 221. Air to the spring compressing chamber 217 enters through opening 216. When a sufficient pressure of air is present in chamber 217, the piston 218 is forced upwardly, as seen in FIG. 8. This compresses spring 243 and also brings disc 238 upwardly in the view close to the inner wall 201.

When spring 243 is compressed, the service brake works in the normal manner, that is, under the influence of air pressure in the service chamber 220 acting on flexible diaphragm 222. When pressure is increased, diaphragm 222 is forced downwardly in the view of FIG. 8, moving push rod 226 and pad 227, thereby to apply the brake. Under these conditions, with pressure remaining in chamber 217, piston 218 and piston rod 234 remain as shown in FIG. 8. When pressure is reduced in chamber 220, the diaphragm 222 moves upwardly to the view shown in FIG. 8. Push rod 226 moves upwardly along with it, forced by return spring 228. This acts to release the brake.

When air, by whatever reason is released from chamber 217, of the spring 243 forces piston 218 and pressure plate 238 downwardly in the view of FIG. 8, thereby applying the brakes. The brakes can be released only by reinstating the air pressure in chamber 217 or by using a release bolt.

To utilize the release bolt 259 as seen in FIG. 8, there must be provided a perforated plate (such as plate 109 in FIG. 7) and preferably a washer in the nature of washer 140 as in FIG. 7. When such are present, provided by the operator, the cap 209 can be removed, the bolt 250 unscrewed from hub 218a and removed from the spring chamber. For the bolt outside the housing 205, a plate like 109 in FIG. 7 (not seen) may be laid on flange 207 with a washer (not seen) laid on top of same and bolt 250 passed therethrough to thread into the internally threaded portion 234a of hub 218a. The bolt thus acts as a jack screw and pulls back the piston 218 compressing the power spring 243. When the brake is to be released, the bolt is unscrewed, permitting the piston 218 to move axially in the view of FIG. 8. The bolt is removed from the washer and the plate, the latter two are removed from near opening 208 and the bolt is rethreaded back into the piston hub 218a.

It is possible to have the recess 206 of lesser depth than that seen in FIG. 8 whereby the washer (not shown) may be placed under the bolt head 250b without the latter contacting the cap 209 when the piston is in the extreme compressed spring position of FIG. 8 and the bolt is screwed all the way in. Likewise, a plate as plate 109 may be provided and screw holes into flanges 207 in the manner of FIG. 7. The purpose of showing the instant view is to show how a mechanical release bolt may be provided within an add-on brake without the operator having the option for the mechanical release by having the plate 109 and the washer 140 present. This presents any mechanical release of the operator on the road, which is sometimes undesirable. Thereafter, when the vehicle is towed into the shop or when a pick-up crew arrives for same, the plate 109 and the washer can be provided, the bolt already being present in the unit, but not operable until such aids are present. This also permits mechanical release of the add-on type unit, if desired, only in the shop or coming out of the factory, if such is desired.

When spring 243 has been expanded from the compressed position of FIG. 8, it forces rod 234 and, through diaphragm 222, rod 226 into brake on position. This does not necessarily make the inward portion of piston 218 abut inner wall 201.

When the spring 243 of FIG. 8 has been mechanically released, that is, when the bolt 250 has been unscrewed from hub 218a, and the mechanical release function so performed as described above, the piston 218 is drawn toward the outer wall 205a and ultimately the outward flange 218d of piston 218 approaches inward flange 205b of wall 205. When this is the case, in mechanical release, the position of the piston 218 relative to cylindrical side wall 205 is exactly that shown in FIG. 8. With bolt 250 holding the piston in this view, in cooperation with a plate 109 and a washer (not seen), it may be seen that a "unit" comprising the piston 218, the compressed power spring 243 and the outer wall unit 205 is provided. This "unit" may be "condensed" or slid into wall 200 whereby the outer wall 205a essentially is in line with outer flange 200a of wall 200 with the innerwall or face of piston 218 approaching inner wall 201.

This telescoping or condensing capacity provides a great condensation of space or volume for storage purposes of these add-on brakes and also for shipment of same.

Likewise, when the unit has been mechanically released, to some extent the spring-wall-piston unit is movable inwardly and outwardly, which is another indication that the mechanical release is in effect and the driver should not proceed with the vehicle.

When the unit has been mechanically released, the add-on brake unit may be disassembled completely as follows. In the first place, assume ring 230 is removed. This permits the removal of lower housing portion 223, rod 226 and pad 227, as well as diaphragm 222. Thereafter, screw 239 permits the removal of disc 238 from rod 234. Following this, the screws 213 are removed whereby inner wall 201 may be taken out of the inward end of wall 200. From this, it may be seen that the entire piston 218-spring 243-wall 205 unit may be pulled out of wall 200 as an operating unit, locked by the mechanical release.

Looking at FIG. 8, the two-piece cylinder construction permits the unit to telescope, when caged, for ease in engaging the push rod to the wedge assembly, before engaging the mounting thread. Further, the piston, spring and spring retainer can be removed from the cylinder as an assembly for maintenance, lubrication and seal replacement.

Figures 9, 10:
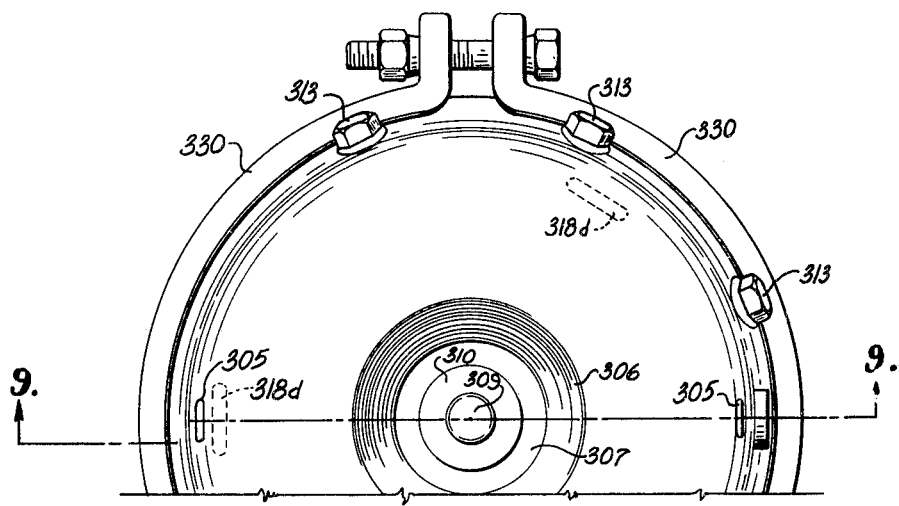
FIG. 9 is a side-sectional view of a modification of the add-on spring emergency and parking brake assembly with mechanical release or spring back-off means shown in inside storage, the anti-explosion feature of the modifications of FIGS. 1–4, inclusive and FIG. 5 and FIG. 6 also omitted. This view is a view taken along the lines 9—9 of FIG. 10 in the direction of the arrows.
FIG. 10 is a partial plan view of the device of FIG. 9 looking downwardly in the view of FIG. 9.

FIG. 9 is a side sectional view of a modification of the add-on spring emergency and parking brake assembly with mechanical release or spring back-off means shown in inside storage, the anti-explosion feature of the modifications of FIGS. 1–4, inclusive and FIG. 5 and FIG. 6 also omitted. This view is a view taken along the lines 9—9 of FIG. 10 in the direction of the arrows.

FIG. 10 is a partial plan view of the device of FIG. 9 looking downward in the view of FIG. 9.

Referring, then, to FIGS. 9 and 10, at 300 is seen the cylindrical side wall of a spring brake cylinder. At the inward (toward the vehicle brake assembly) end of wall 300 is positioned an interwall 301 having an opening 302 therethrough in a slightly outwardly formed portion 303 thereof. Sidewall 300, at the outer end thereof, has end wall 304 having vent openings 305 at the curving juncture of side wall 300 and end wall 304. The outer wall portion 304 has a central, inwardly extending recess 306. Recess 306 has a central flange 307 at the inward end thereof with an opening 308 therethrough. A rubber or plastic plug 309 carrying a cap plate or washer 310 seals opening 308 in flange 307.

The inward portion of side wall or housing 300 connects to interwall 301 by a plurality of bolts 313 (FIG. 10) passing through openings in the outwardly flanged portion 314 of housing 300 into internally threaded holes (not seen) in the peripheral portion of interwall 301. Interwall 301 additionally has outwardly extending flange 314 having seal 315 received in a circumferential peripheral groove of flange 314. An air passage 316 connects with chamber 317, which is defined as being between the outer face of interwall 310 and the innerface of a piston generally designated 318.

Interwall 301 further has an inward circumferential flange portion 319 which acts as the outer end well of the pressure half of a service chamber 320, the same having two pressure inlet passages or openings which penetrate the interwall outer periphery at roughly about the same height as passage 316 (but feeding chamber 320), but are not seen in the various views, as they are angularly displaced from passage 316. The same is true of pressure inlet or opening 121 of FIG. 7, which is formed through the interwall outer flange at a position angularly disposed from the passage 116. The other half of the service chamber wall is designated 323, flange 319 and wall 323 receiving conventional, flexible diaphragm 322 therebetween at the periphery thereof in engagement thereagainst when the service chamber is assembled. The diaphragm abutting flange 324 is provided for on service chamber wall 323, at the outward portion thereof. Vent openings 325 are further provided in wall 323.

Piston rod 326 has pad 327 connected to the outer end thereof, the latter abutting in conventional manner against the inward side of diaphragm 322. A diaphragm return spring 328 abuts outwardly spring retainer 329. An opening 331 is provided through the inward wall 331a of the service chamber. Further, bolts 332 having washers 322a pass through openings 333 whereby to fasten the entire service brake chamber and spring emergency brake to the vehicle.

Returning to the add-on portion of the brake assembly, which constitutes interwall 301 and that portion of the brake outward therefrom, elongate, hollow piston or push rod 334 is slidably received within opening 302 with seal means 335 and 336 retained thereagainst by retainer 337. Plate or disc 338 is connected to the inner end of push rod 334 by screw 339 and abuts the side of diaphragm 322 opposite that of pad 327. The outward center portion of piston rod 334 is hollow for part of its length and internally threaded in the zone 334a whereby to receive the externally threaded shaft portion 350a of a bolt having enlarged head 350b. The outer diameter of head 350b must be able to pass through opening 308 in flange 307 of housing outer wall 304.

Piston 318 has peripheral outward flange 318b with seal receiving portion 318c having seals 340 and 341 in circumferential grooves in piston portion 318c. Further, piston portion 318c has mounted on the outward portion thereof, at least three end wall abutting lugs or stops 318d. A recess 318f is provided in the central under side of inner side of piston 318 whereby to overlie extension 303. Power spring 343 abuts against the outer face of piston 318 and the inner face of outer wall 304.

Compressed air to the service chamber 320 can enter and exhaust through a tapped hole, previously described, not seen, through interwall outer flange, while air to the spring compression chamber 317 enters through opening 316. When a sufficient pressure of air is present in chamber 317, the piston 318 is forced upwardly, as seen in FIG. 9. This compresses spring 343, and also brings disc 338 upwardly in the view of FIG. 9 close to the interwall 301.

When the spring is compressed, the service brake works in the normal manner, that is, under the influence of air pressure in the service chamber 320 acting on the flexible diaphragm 322. When air pressure in chamber 320 is increased, diaphragm 322 is forced downwardly in the view of FIG. 9, moving push rod 326 and pad 327 thereby to apply the brake. Under these conditions, with pressure remaining in chamber 317, piston 318 and piston rod 334 remain as shown in FIG. 9. When pressure is reduced in chamber 320, the diaphragm moves upwardly to the point shown in the view of FIG. 9. Push rod 326 moves upwardly along with it, forced by return spring 328. This acts to release the brake.

When air, by whatever reason, is released from chamber 317, the spring 343 forces piston 318 and pressure plate 338 downwardly in the view of FIG. 9, thereby applying the brakes. The brakes can be released only by reenstating the air pressure in chamber 317 or by using the release bolt, as described below.

The manner of use of the boltt 350 to cage the spring 343 between the outer wall 304 and the piston 318 is precisely the same as previously described with respect to the preceding figures and will not be redescribed in great detail. However, it involves removing plug 309 from opening 308 and the washer 310 therefrom. Bolt 350 is then unscrewed from internally threaded portion 334a of the push rod 334. Bolt 350 is then passed through the central opening of plate or washer 310. The externally threaded portion 350a of bolt 350 is then again threaded into the internally threaded portion 334a, with the difference that the washer 310 is between the bolt head 350b and the flange 307. The mechanical release or back-off means may then be applied to compact the spring 343 to the degree desired. To release the piston 318 and spring 343, this process is reversed and the bolt 350 is internally stored within the device. Plug 309 is replaced in opening 308 as seen in FIG. 9, with the washer 310 thereon. The essence of backing off spring 343 with the back-off bolt in FIG. 9 is that release of the ring 330 permits the removal of interwall 301, diaphragm 322 and the outward attachments to interwall 301. Thereafter, unscrewing screw 339, to remove plate 338, interwall 301 may be removed for access to the seals 335 and 336 or the interior of chamber 317.

There is additionally supplied a filter insert 360 running from the peripheral inside wall of indentation 306 out to the interface of the top or outward portion of cylindrical side wall 300 whereby to cover the opening 305. The lugs 318D punch into this material in their stop abutment against the end wall 304, but do not destroy the air seals at the vents 305. Thus, air which is drawn into and exhausted from the spring chamber 361 passes through a filter of porous resilient material as at 360, such as urethane foam.

In FIGS. 7 and 9, the housing for the spring emergency portion of the brake (or the add-on portion of the brake) in both cases is unitary from its connection to the interwall (which defines the outer wall of the service chamber) and the center perforation in the end wall of the said emergency portion of the housing. This contrasts sharply with FIGS. 3 and 5, which show a typical add-on unit with the end cap held in by a snap ring to the main emergency cylinder wall, and FIG. 8 which shows the condensable housing. The add-on brake units in the prior art typically show either an end cap with a snap ring holding same in a cylindrical emergency housing wall or a split housing as in FIG. 3 of this application. Other prior art shows the emergency housing threaded onto an extension of the interwall as well as an outer stop for a flat piston comprising a central plug. The latter is bad because it tends to bow out the end of the spring housing in the center. A flat piston tends to bind and cant under high air pressures.

Our housing improvement in FIGS. 7 and 9 is to provide concentricity and centering effects of the outwardly tapered housing skirt on the tapered bulk head plug. We employ a plurality of cap screws to tie down the skirt on the plug. When removed (follower foot 338 or 138) and the spring caged, the entire housing can be lifted off as a unit. Further, we employ peripheral bearing of the piston with no hazard of punching out the center of the end housing.

FIG. 7 has a double tapered cam giving a stop on a shorter length peripheral piston wall.

Vent 205c is placed in a position in FIG. 8 which is freed by the internal end 205b of the outboard condensable portion 205 of the housing from coverage by the end 218d of the piston.

In FIGS. 7 and 9, by virtue of the unitary housing and peripheral bearing of the piston, we do not employ a joint between the spring retainer (outer housing of spring chamber) and the inner part of the spring chamber as is present in FIG. 1 and FIG. 5. There is always an explosion potential if the snap ring or band 25 or 77 is knocked off. Such joint is generally in the vicinity of the wheel area, as opposed to an inward connection to the outer portion of the service chamber as in FIGS. 7 and 9. Bands per se (snap rings) or screw anchored bands or snap rings tend to corrode and deteriorate, also. Further, in our structure, there is no loss of the spring if we lose one or more cap screws 113 or 313. We might lose pressure in the spring compression air chamber 117 or 317, but this would just permit the spring application of the brake. On the other hand, loss of the snap ring 25 or 77 would cause a spring explosion. All cap screws must be removed to take out the spring unit in FIGS. 7 and 9.

From the foregoing, it will be seen that this invention is one well adapted to attain all of the ends and objects hereinabove set forth together with other advantages which are obvious and which are inherent to the structure.

As many possible embodiments may be made of the invention without departing from all scope thereof, it is to be understood that all matter herein set forth as shown in the accompanying drawings is to be interpreted as illustrative and not in a limiting sense.

Having thus described our invention, we claim:

1. In combination,
a cylinder,
said cylinder having inner and outer ends with respect to a vehicle brake mechanism,
one end of said cylinder closed by an inner wall member having a central opening therethrough,
the other end of said cylinder closed by an outer wall member also having a central opening therethrough,
a piston slidably fitting said cylinder with the outer face thereof facing the outer wall member of said cylinder,
stop means to limit the travel of said piston toward the cylinder outer wall,
said cylinder outwardly vented to permit piston movement,
a piston rod connected at one end centrally of said piston, extending inwardly thereof and having a sliding fit through the inner wall member central opening,
a hollow, internally threaded hub centrally connected to said piston opposite said piston rod and extending outwardly thereof,
said hub having a sliding fit through outer wall member central opening,
an externally threaded bolt member threadably engaged with the piston hub,
the outer wall member of the cylinder centrally dished thereof including said central opening therein, and
a removable perforated plate fixed to said outer wall member and covering said central dished portion thereof adapted to receive in cooperation said externally threaded bolt member in a back-off operation of said piston once said coil compression spring means has expanded,
said hub limited in length whereby, when said bolt is fully threaded therein, the bolt outer face does not contact the perforated plate when the piston is against its outer stop means.

2. A device as in claim 1 including a vent opening in said piston rod communicating from the inward side of said piston with the hollow center of the piston hub.

3. A device as in claim 1 wherein said hub and piston rod are integral with one another.

4. A device as in claim 1 wherein said hub and piston rod are integral with one another and said piston.

5. Brake actuating mechanism comprising a closed housing having inner and outer end walls,
said walls inner and outer with respect to a vehicle brake mechanism,
a flexible diaphragm within said housing and peripherally secured in place,
means for introducing fluid under pressure to said housing adjacent the outer end wall thereof and on the outer side of said diaphragm,
a brake operating rod on the other inner side of said diaphragm axially arranged relative thereto,
said rod projecting through the inner end wall of the housing for reciprocatory movements,
a disc-like pad on the outer end of said brake rod operable to bear against said diaphragm,
an open-ended auxiliary cylinder at one end of said housing and the outer end wall of said housing constituting the inner end wall of said cylinder,
said outer end wall of said housing having a central opening therethrough,
the other end of said cylinder closed by an outer wall member also having a central opening therethrough,
a piston slidably fitting said cylinder with the outer face thereof facing the outer wall member of said cylinder,
stop means to limit the travel of said piston toward the cylinder outer wall,
coil compression spring means seating between said piston outer face and cylinder outer wall member,
said cylinder outwardly vented to permit piston movement,
a piston rod connected centrally of said piston, extending inwardly thereof and having a sliding fit through the housing outer end wall central opening,
a hollow, internally threaded hub centrally connected to said piston opposite said piston rod and extending outwardly thereof,
said hub having a sliding fit through the outer wall member central opening,
an externally threaded bolt member threadably engaged with said piston hub,
the outer wall member of the cylinder centrally dished thereof including said central opening therein,
a removable perforated plate fixed to said cylinder outer wall member and covering said central dished portion thereof adapted to receive in combination said externally threaded bolt member in a back-off operation of said piston once said coil compression spring means has acted,
said hub limited in length whereby, when said bolt is fully threaded therein,
the bolt outer face does not contact the perforated plate when the piston is against its outer stop means, and
means for introducing fluid under pressure to said cylinder adjacent the housing outer end wall for normally holding the piston in the region of the cylinder outer wall member thereby to hold said coiled compression spring means under compression.

6. A device as in claim 1 wherein the dishing of the central outer wall member is to a depth approaching the piston outer face when same is against its stops and a washer is provided around the bolt of sufficient outer diameter to serve as an anti-explosion device in cooperation with said dished portion.

7. A device as in claim 5 wherein the dishing of the central outer wall member is to a depth approaching the piston outer face when same is against its stops and a washer is provided around the bolt of sufficient outer diameter to serve as an anti-explosion device in cooperation with said dished portion.

8. In combination, a cylinder,
said cylinder having inner and outer end with respect to a vehicle brake mechanism,
one end of said cylinder closed by an inner wall member having a central opening therethrough,
the other end of said cylinder closed by an outer wall member also having a central opening therethrough,
a piston slidably fitting said cylinder with the outer face thereof facing the outer wall member of said cylinder,
coiled compression spring means seating between said piston outer face and cylinder outer wall member,
stop means to limit the travel of said piston toward the cylinder outer wall,
said cylinder outwardly vented to permit piston movement,
a piston rod connected at one end centrally of said piston, extending inwardly thereof, and having a sliding fit through the inner wall member central opening,
a hollow, internally threaded hub centrally connected to said piston opposite said piston rod and extending outwardly thereof, the internal threading of said hub communicating into said piston rod past the piston inner face,
said hub having a sliding fit through the outer wall member central opening,
a vent opening in said piston rod communicating on the inner side of the piston with the hollow center of the piston hub,
an externally threaded bolt member threadably engaged with the piston hub and sealing said hollow center of the piston hub when in full threadable engagement therewith,
the outer wall member of the cylinder centrally dished thereof including said centrally opening therein,
and a removable perforated plate fixed to said outer wall member and covering said central dished portion thereof adapted to receive in cooperation said externally threaded bolt member in a backoff operation of said piston once said coil compression spring means has expanded,
said hub limited in length whereby, when said bolt is fully threaded therein, the bolt outer face does not contact the perforated plate when the piston is against its outer stop means and thus the threaded bolt, in sealing engagement in the piston lug, is continuously carried by said piston.

9. In combination, a cylinder,
said cylinder having inner and outer ends with respect to a vehicle brake mechanism,
one end of said cylinder closed by an inner wall member having a central opening therethrough,
the other end of said cylinder closed by an outer wall member also having a central opening therethrough,
a movable wall slidably fitting said cylinder with the outer face thereof facing the outer wall member,
coiled compression spring means seating between said movable wall outer face and cylinder outer wall member,
stop means to limit the travel of said movable wall toward the cylinder outer wall,
said cylinder outwardly vented to permit movable wall movement,
a piston rod connected at one end centrally of said movable wall, extending inwardly thereof and having a sliding fit through the inner wall member central opening,
a hollow, internally threaded hub centrally connected to said movable wall opposite said piston rod and extending outwardly thereof,
an externally threaded bolt member threadably engaged with the movable wall hub,
a removable perforated plate fixed to said outer wall member and covering said central portion thereof adapted to receive in cooperation said externally threaded bolt member in a back-off operation of said piston once said coil compression spring means has expanded,
said hub limited in length whereby, when said bolt is fully threaded therein, the bolt outer face does not contact the perforated plate when the piston is against its outer stop means.

10. A device as in claim 9 wherein said hub and movable wall rod are integral with one another.

11. A device as in claim 9 wherein said hub and movable wall rod are integral with one another and said movable wall.

12. Brake actuating mechanism comprising a closed housing having inner and outer end walls,
said walls inner and outer with respect to a vehicle brake mechanism,
a flexible diaphragm within said housing and peripherally secured in place,
means for introducing fluid under pressure to said housing adjacent the outer end wall thereof and on the outer side of said diaphragm,
a brake operating rod on the other inner side of said diaphragm axially arranged relatively thereto,
said rod projecting through the inner end wall of the housing for reciprocatory movements,
a disc-like pad on the outer end of said brake rod operable to bear against said diaphragm,
an open-ended auxiliary cylinder at one end of said housing and the outer end wall of said housing constituting the inner end wall of said cylinder,
said outer end wall of said housing having a central opening therethrough,
the other end of said cylinder closed by an outer wall member also having a central opening therethrough,
a movable wall slidably fitting said cylinder with the outer face thereof facing the outer wall member of said cylinder,
stop means to limit the travel of said movable wall toward the cylinder outer wall,
coil compression spring means seating between said movable wall outer face and cylinder outer wall member,
said cylinder outwardly vented to permit movable wall movement,
a movable wall rod connected centrally of said movable wall, extending inwardly thereof and having a sliding fit through the housing outer end wall central opening,
a hollow, internally threaded hub centrally connected to said movable wall opposite said piston rod and extending outwardly thereof,
an externally threaded bolt member threadably engaged with said movable wall hub,
a removable perforated plate fixed to said cylinder outer wall member and covering said central portion thereof adapted to receive in combination said externally threaded bolt member in a back-off operation of said movable wall once said coil compression spring means has acted,
said hub limited in length whereby, when said bolt is fully threaded therein, the bolt outer face does not contact the perforated plate when the movable wall is against its outer stop means, and
means for introducing fluid under pressure to said cylinder adjacent the housing outer end wall for normally holding the movable wall in a region of the cylinder outer wall member thereby to hold said coil compression spring means under compression.

References Cited

UNITED STATES PATENTS

| | | | |
|---|---|---|---|
| 2,754,805 | 7/1956 | Beman | 92—63 X |
| 3,020,094 | 2/1962 | Murty et al. | 92—63 X |
| 3,090,359 | 5/1963 | Hoppenstand | 92—63 X |
| 3,112,959 | 12/1963 | Kateley | 92—63 X |
| 3,131,609 | 5/1964 | Dobrikin et al. | 92—63 |
| 3,152,521 | 10/1964 | Cruse | 92—63 |
| 3,218,796 | 11/1965 | Fites | 92—63 X |
| 3,244,079 | 4/1966 | Herrera | 92—63 |
| 3,293,995 | 12/1966 | Smith | 92—110 |

MARTIN P. SCHWADRON, Primary Examiner

I. C. COHEN, Assistant Examiner

U.S. Cl. X.R.

92—64, 128 130